United States Patent
Inoue

(10) Patent No.: US 8,345,370 B2
(45) Date of Patent: Jan. 1, 2013

(54) MAGNETIC DISK DRIVE AND REFRESH METHOD FOR THE SAME

(75) Inventor: Hiroaki Inoue, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 63 days.

(21) Appl. No.: 13/100,008

(22) Filed: May 3, 2011

(65) Prior Publication Data

US 2012/0002315 A1   Jan. 5, 2012

(30) Foreign Application Priority Data

Jun. 30, 2010   (JP) ................................ 2010-150348

(51) Int. Cl.
  *G11B 19/04* (2006.01)
  *G11B 27/36* (2006.01)
  *G11B 5/09* (2006.01)
(52) U.S. Cl. ................ 360/60; 360/31; 360/48
(58) Field of Classification Search .................. None
  See application file for complete search history.

(56) References Cited

U.S. PATENT DOCUMENTS

| 7,870,460 B2* | 1/2011 | Iketaki et al. ................. 714/754 |
| 7,925,828 B2* | 4/2011 | Aoki et al. .................... 711/112 |
| 8,154,814 B2* | 4/2012 | Aoki et al. ....................... 360/60 |
| 2009/0244775 A1* | 10/2009 | Ehrlich .......................... 360/135 |
| 2010/0199106 A1* | 8/2010 | Iida ............................... 713/189 |

FOREIGN PATENT DOCUMENTS

| JP | 07029323 | 1/1995 |
| JP | 2004-273060 | 9/2004 |
| JP | 2006-179102 | 7/2006 |
| JP | 2008-192279 | 8/2008 |
| JP | 2009-245577 | 10/2009 |

OTHER PUBLICATIONS

JP 2010-150348 Office Action (Jul. 26, 2011) (English translation attached).

\* cited by examiner

*Primary Examiner* — Wayne Young
*Assistant Examiner* — Regina N Holder
(74) *Attorney, Agent, or Firm* — Patterson & Sheridan, LLP

(57) ABSTRACT

According to one embodiment, a magnetic disk drive includes a grouping module and a refresh controller. The grouping module partitions a set of tracks on a disk into a plurality of groups. Each of the plurality of groups includes a plurality of tracks including at least two tracks with nonconsecutive physical positions. The refresh controller controls refresh process for each of the plurality of groups.

16 Claims, 10 Drawing Sheets

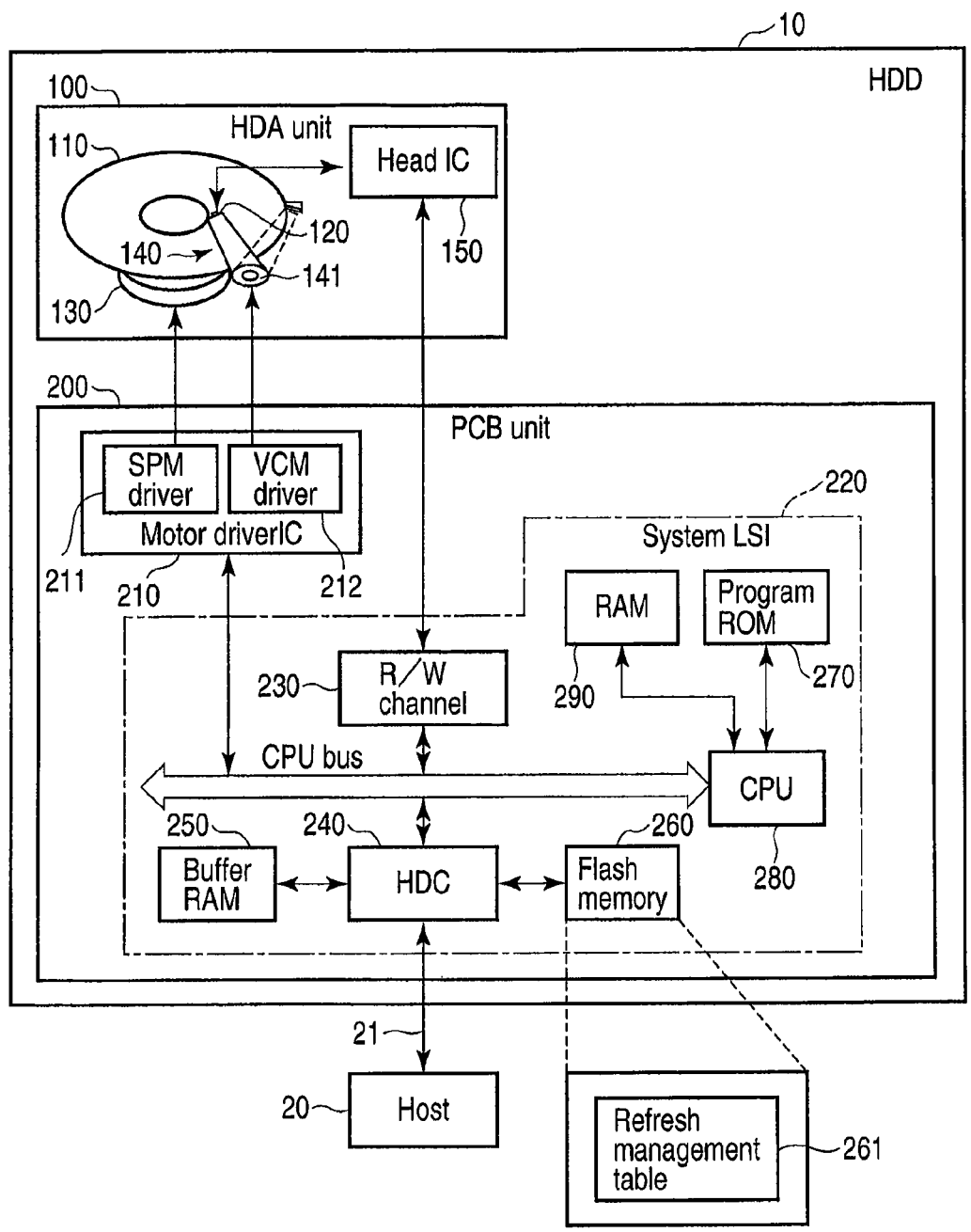
F I G. 1

261 Refresh management table

| Group number (x) | Write count (WCx) | Bitmap (BMx) | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| 0000h | 0012h | 0 | 0 | 0 | 0 | 0 | 0 | 0 | 0 | 0 | 0 | 0 | 0 | 0 | 0 | 1 | 0 |
| 0001h | 0023h | 0 | 0 | 0 | 0 | 0 | 0 | 0 | 0 | 0 | 0 | 0 | 1 | 0 | 0 | 1 | 0 |
| 0002h | 0293h | 0 | 0 | 0 | 0 | 0 | 0 | 0 | 0 | 1 | 0 | 0 | 1 | 0 | 0 | 1 | 1 |
| 0003h | 0928h | 0 | 0 | 0 | 0 | 0 | 0 | 0 | 0 | 0 | 0 | 0 | 0 | 1 | 0 | 1 | 1 |
| 0004h | 0048h | 0 | 0 | 0 | 0 | 0 | 0 | 0 | 0 | 0 | 0 | 0 | 1 | 1 | 0 | 1 | 0 |
| 0005h | 0029h | 0 | 0 | 0 | 0 | 0 | 0 | 0 | 0 | 0 | 0 | 1 | 1 | 0 | 0 | 0 | 0 |
| 0006h | 0100h | 0 | 0 | 0 | 0 | 0 | 0 | 0 | 0 | 1 | 1 | 1 | 1 | 1 | 0 | 1 | 0 |
| 0007h | 0200h | 0 | 0 | 0 | 0 | 0 | 0 | 0 | 0 | 1 | 0 | 0 | 0 | 0 | 0 | 0 | 0 |
| 0008h | 0060h | 0 | 0 | 0 | 0 | 0 | 0 | 0 | 0 | 0 | 0 | 0 | 0 | 0 | 0 | 1 | 0 |

F I G. 5

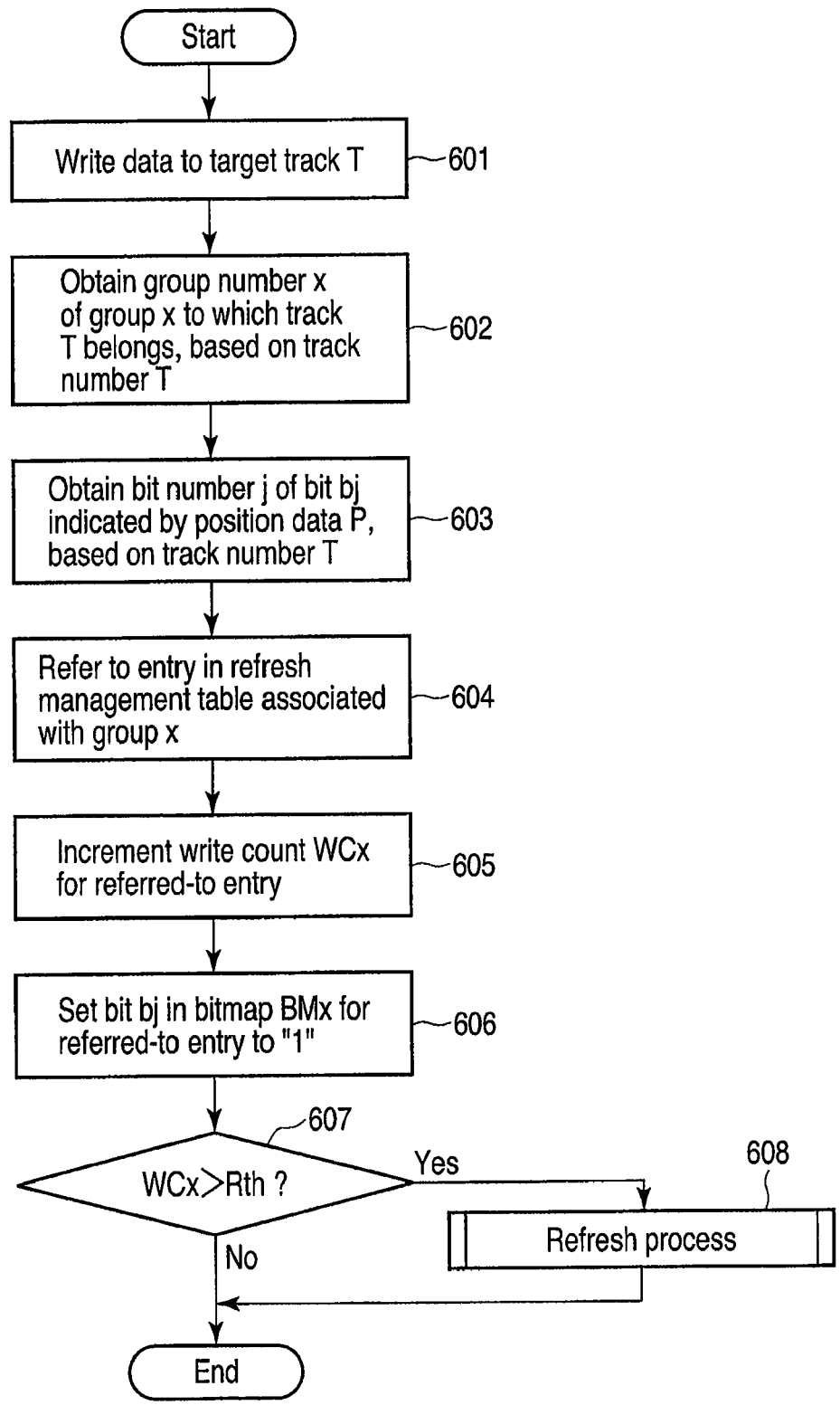
F I G. 6

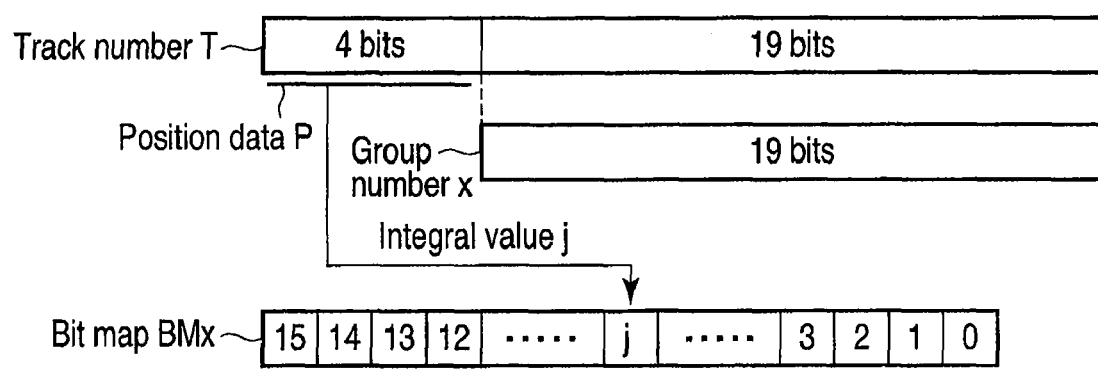
F I G. 7

| Track area start number (Ts) | Track area end number (Te) | Subgrouping coefficient (J) | Bit number (j) |
|---|---|---|---|
| 00000h | 0FFFFh | 1 | 0 |
| 10000h | 2FFFFh | 2 | 1 |
| 30000h | 4FFFFh | 2 | 2 |
| 50000h | 6FFFFh | 2 | 3 |
| 70000h | 8FFFFh | 2 | 4 |
| 90000h | BFFFFh | 3 | 5 |
| C0000h | EFFFFh | 3 | 6 |
| ⋮ | ⋮ | ⋮ | ⋮ |

1100 Subgrouping coefficient table

F I G. 1 1

US 8,345,370 B2

MAGNETIC DISK DRIVE AND REFRESH METHOD FOR THE SAME

CROSS-REFERENCE TO RELATED APPLICATIONS

This application is based upon and claims the benefit of priority from Japanese Patent Application No. 2010-150348, filed Jun. 30, 2010; the entire contents of which are incorporated herein by reference.

FIELD

Embodiments described herein relate generally to a magnetic disk drive and a refresh method for the drive.

BACKGROUND

In recent years, with increased capacities of magnetic disk drives, much effort has been made to increase recording density and track density. The increased track density has reduced the interval (that is, track pitch) between tracks on a disk. With the reduced track pitch, when data is magnetically written to a track, data (magnetic data) already magnetically written to the adjacent tracks may be magnetically degraded. That is, the magnetic data in the adjacent tracks (more specifically, the intensity of a magnetic field from the magnetic data) may be weakened. Such a phenomenon is called side erase. The cause of the side erase phenomenon is an error in positioning of a head over a target track and a magnetic field leaking from the head.

Even if the side erase phenomenon weakens the magnetic data in the corresponding track, a read error does not necessarily occur immediately. Repeated side erase phenomena gradually weaken the magnetic data in the corresponding track. When the number of occurrences of the side erase phenomena exceeds a certain threshold, restoring the magnetic data is difficult even with the use of an error correcting code (ECC) to a maximum extent. This leads to a read error. As a result, the magnetic data may be lost.

Thus, for the recent magnetic disk drives, data refresh (rewrite) has becoming essential; the data refresh is used out to restore magnetically degraded magnetic data before read of the magnetic data from the corresponding track is disabled by repeated side erase phenomena. The data refresh is known as an operation of reading the magnetically degraded magnetic data from the corresponding track and writing the read magnetic data to the track again. This rewrite of the magnetic data (that is, data refresh) allows a magnetic field from the magnetic data to be enhanced and stabled.

However, excessively frequent refreshing tracks on the disk may unfavorably degrade the performance of the whole magnetic disk drive. On the other hand, a track in which the side erase phenomenon occurs frequently is correlated with the number of data writes to the tracks adjacent to this track.

Thus, to allow this correlation to be utilized, a technique for counting the number of writes for each of the tracks on the disk is applied to the conventional magnetic disk drives. According to this technique, the tracks adjacent to a track with the write count exceeding the threshold are detected as tracks with the magnetic data weakened by repeated side erase phenomena (that is, tracks to be refreshed).

However, the technique for counting the number of writes for each of the tracks on the disk requires a very large capacity of work memory areas in order to hold the write count for each track. Thus, a technique has recently been proposed which involves partitioning a set of tracks on the disk into a plurality of groups in the radial direction of the disk and counting the number of writes (the total number of writes) for each of the groups (this technique is hereinafter referred to as a conventional technique). The tracks belonging to each group are consecutive in the radial direction of the disk.

In the above-described conventional technique, the number of writes (the total number of writes) is counted for each of the groups, and data is refreshed in all the tracks belonging to a group with the write count exceeding the threshold. However, accesses (for example, writes) from a host to the magnetic disk drive are local. That is, accesses from the host are likely to concentrate on several of all the tracks in the group which are consecutive in the radial direction of the disk. This conversely indicates that any of the tracks belonging to the group with the write count exceeding the threshold is adjacent to a track subjected to only a small number of data writes. The data written to the adjacent tracks is likely to be prevented from being magnetically degraded. However, in the conventional technique, the data in such a track is also refreshed. That is, unwanted refreshing occurs.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an exemplary configuration of an electronic device with a magnetic disk drive according to a first embodiment;

FIG. 5 is a diagram showing an example of a refresh management table applied in the first embodiment;

FIG. 6 is a flowchart showing an exemplary procedure of operations for a data write according to the first embodiment;

FIG. 7 is a diagram showing an exemplary mechanism applied in the first embodiment and which allows a group number and the bit number of a bit in a bitmap to be obtained based on a track number;

FIG. 11 is a diagram showing an example of a subgrouping coefficient table applied in a fourth embodiment.

DETAILED DESCRIPTION

Figure 2:
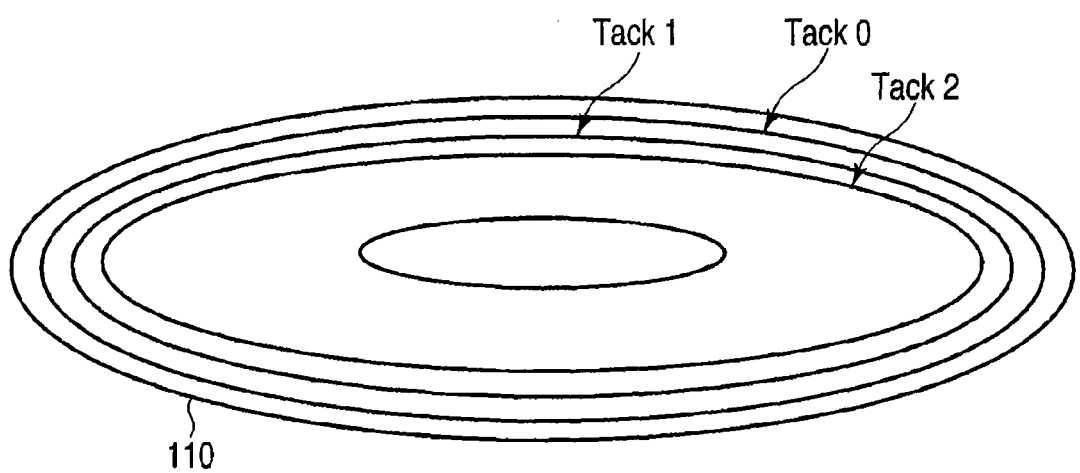
FIG. 2 is a conceptual drawing showing an example of the format of a recording surface of a disk according to the first embodiment.

Various embodiments will be described hereinafter with reference to the accompanying drawings. In general, according to one embodiment, a magnetic disk drive comprises a grouping module and a refresh controller. The grouping module is configured to partition a set of tracks on a disk into a plurality of groups. Each of the plurality of groups comprises a plurality of tracks including at least two tracks with nonconsecutive physical positions. The refresh controller is configured to control refresh process for each of the plurality of groups.

First Embodiment

FIG. 1 is a block diagram showing an exemplary configuration of an electronic device with a magnetic disk drive according to a first embodiment. The magnetic disk drive is generally called a hard disk drive. In FIG. 1, the electronic device comprises a hard disk drive (HDD) 10 and a host (host system) 20. The electronic device is, for example, a personal computer, a video camera, a music player, a mobile terminal, or a mobile phone. The host 20 utilizes the HDD 10 as a storage device for the host 20.

The HDD 10 comprises a head disk assembly unit (HDA unit) 100 and a printed circuit board unit (PCB unit) 200. The HDA unit comprises a disk (magnetic disk) 110, a spindle motor (SPM) 130, an actuator 140, and a head IC 150. The disk 110 comprises two disk surfaces, an upper disk surface and a lower disk surface. At least one of the two disk surfaces (for example, the upper disk surface) of the disk 110 forms a recording surface on which data is magnetically recorded. The disk 110 is spun at high speed by the SPM 130.

The actuator 140 comprises a head arm located in association with the recording surface of the disk 110 and including a head (magnetic head) 120 at the tip of the head arm. The head 120 is used to write and read data to and from the disk 110. A head number H is assigned to the head 120. In the first embodiment, the head number H of the head 120 is assumed to be 0.

For convenience of drawing, FIG. 1 shows an example of the HDD 10 in which the head 120 is located in association with one disk surface of the disk 110. However, in general, the two disk surfaces of the disk 110 both form recording surfaces, and heads are arranged in association with the respective disk surfaces. If the head is located in association with the lower disk surface (recording surface) of the disk 110, for example, 1 is assigned to the head as the head number H. Furthermore, the configuration in FIG. 1 is assumed to be the HDD 10 with the single disk 110. However, a plurality of disks 110 may be arranged in a stacked manner in the HDD.

FIG. 2 is a conceptual drawing showing an example of the format of the recording surface of the disk 110. As shown in FIG. 2, the recording surface of the disk 110 comprises a plurality of tracks (data tracks) including a track 0, a track 1, and a track 2. In the present embodiment, the plurality of tracks are assumed to be shaped to be concentric. Track 0, track 1, and track 2 are consecutively arranged in the radial direction of the disk 110. That is, the physical positions of track 0, track 1, and track 2 are consecutive. The consecutiveness of track 0, track 1, and track 2 means that one or more other tracks are not present between tracks 0 and 1 and between tracks 1 and 2. If one or more other tracks are present between tracks 0 and 1, the physical positions of tracks 0 and 1 are nonconsecutive.

"T" in a track T (T=0, 1, 2, . . . ) shown in FIG. 2 indicates the track number of the track T. The track number T indicates a data track uniquely identified in the HDD 10. The track number T is generally expressed by a combination of the head number H and a cylinder number S. The cylinder numbers S are consecutively assigned to the respective sets each of a plurality of tracks on the recording surface of the disk 110 in order starting from the outer circumference of the disk 110 as in 0, 1, 2, . . . . The cylinder number S is not dependent on the head number H.

Figure 3:
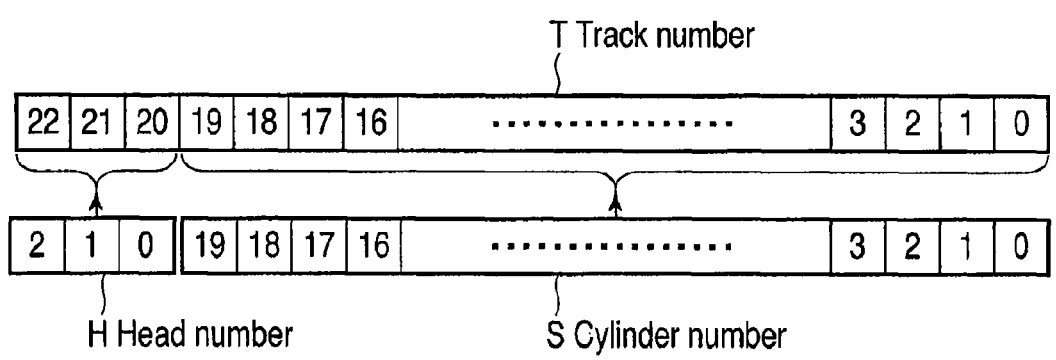
FIG. 3 is a diagram showing an example of the relationship between a track number and a head number and a cylinder number applied in the first embodiment.

The first embodiment assumes that the head number H is expressed by 3 bits, whereas the cylinder number S is expressed by 20 bits. In this case, in order to allow the track T on the disk to be uniquely identified, the track number T corresponding to the track T is defined as follows. In the first embodiment, the track number of the track T is an integer expressed by 23 bits. The upper 3 bits of the track number of the track T is used as the head number H of the head corresponding to the track T. The lower 20 bits is used as the cylinder number S of the track T. FIG. 3 shows an example of the relationship between the track number T and the head number H and the cylinder number S. Track numbers can be optionally assigned provided that the track numbers are not duplicative. Thus, the above-described assignment of the track numbers is illustrative.

Referring back to FIG. 1, the actuator 140 comprises a voice coil motor (VCM) 141. The actuator 140 is driven by the VCM 141 to move the head 120 in the radial direction of the disk 110. The SPM 130 and VCM 141 are driven by the respective driving currents (SPM current and VCM current) supplied by a motor driver IC 210 described below. The head IC 150 amplifies a signal (read signal) read by the head 120. The head IC 150 also converts write data transferred by a read/write channel 230 described below into a write current. The head IC 150 outputs the write current to the head 120.

A PCB unit 200 comprises two LSIs, a motor driver IC 210 and a system LSI 220. The motor driver IC 210 comprises an SPM driver 211 and a VCM driver 212. The SPM driver 211 supplies the SPM 130 with a driving current (SPM current) with a value corresponding to an SPM operation amount specified by a CPU 280, to drive the SPM 130 at a given rotation speed. The VCM driver 212 supplies the VCM 141 with a driving current (VCM current) with a value corresponding to a VCM operation amount specified by the CPU 280, to drive the actuator 140.

The system LSI 220 is an LSI called a system-on-chip (SOC) and comprises a read/write channel (R/W channel) 230, a disk controller (HDC) 240, a buffer RAM 250, a flash memory 260, a program ROM 270, a CPU 260, and a RAM 290 all integrated on a single chip. The R/W channel 230 is a well-known signal processing device configured to carry out signal processing for read and write. The R/W channel 230 digitizes a read signal and decodes the digitized data into read data. The R/W channel 230 also extracts servo data required to position the head 120, from the digitized data. The R/W channel 230 also codes write data.

HDC 240 is connected to the host 20 via a host interface 21. HDC 240 receives commands (a write command, a read command, and the like) transferred by the host 20. HDC 240 controls the data transfer between the host 20 and HDC 240. HDC 240 controls the data transfer between the disk 110 and HDC 240 via the R/W channel 230.

The buffer RAM 250 comprises a buffer area in which data to be written to the disk 110 and data read from the disk 110 via the head IC 150 and the R/W channel 230 are temporarily stored. The buffer RAM 250 also comprises a table area into which a refresh management table 261 described below is loaded from a refresh memory 260 when the HDD 10 is powered on. The flash memory 260 is a rewritable nonvolatile memory. The flash memory 260 is used to store the refresh management table 261, used to manage a refresh operation for each group. The refresh management table 261 may be configured to be stored in a particular storage area on the disk 110 rather than in the flash memory 260. The refresh management table 261 will be described below.

The program ROM 270 is configured to pre-store control programs (firmware programs). The control programs may be stored in a partial area of the flash memory 260. The CPU 280 functions a main controller for the HDD 10. The CPU 280 controls at least some other elements in the HDD 10 in accordance with the control programs stored in the program ROM 270. A partial area of the RAM 290 is used as a work area for the CPU 280.

Figure 4:
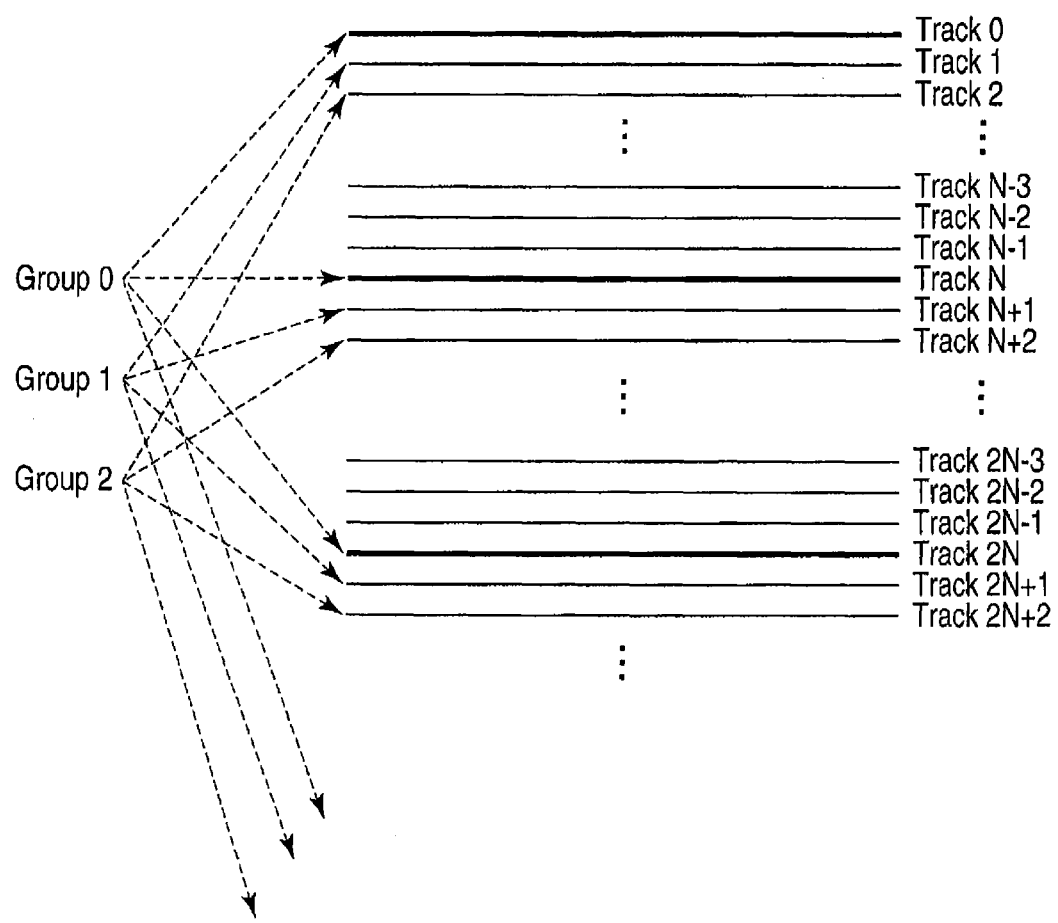
FIG. 4 is a diagram showing the concept of grouping of a set of tracks applied in the first embodiment.

FIG. 4 shows the concept of grouping of a set of tracks (data tracks) which is applied in the first embodiment. The first embodiment assumes that the HDD 10 comprises the single disk 110 and the head 120 located in association with one disk surface of the disk 110 as described above. Thus, the description below assumes that a set of tracks provided on one disk surface of the disk 100 is grouped. If a set of tracks is provided on each of the opposite disk surfaces of the single disk 110, the set of tracks provided on each of the disk surfaces is grouped. If the HDD comprises a plurality of disks 110, a set of tracks provided on each of the opposite disk surfaces of each of the plurality of disks is grouped. In the example shown in FIG. 4, the disk 110 comprises a set of tracks including tracks 0, 1, ..., N−1, N, N+1, ..., 2N−1, 2N, 2N+1, and 2N+2 which are consecutive in the radial direction of the disk 110.

In the first embodiment, the CPU 280 functions as a grouping module to partition the set of tracks into groups each with 16 tracks so that there is a difference of a predetermined number N (the predetermined number N of tracks) between the track number (track position) of one track in each group and the track number of the adjacent track in the same group. The predetermined number N is, for example, $2^{19}$. In this case, for example, a group 0 comprises 16 tracks including tracks 0, N, and 2N with nonconsecutive physical positions. A group 1 comprises 16 tracks including tracks 1, N+1, and 2N+1 with nonconsecutive physical positions. Similarly, a group 2 comprises 16 tracks including tracks 2, N+2, and 2N+2 with nonconsecutive physical positions.

Accesses from the host 20 to the HDD 10 are generally local. Thus, the accesses from the host 20 are likely to concentrate on several adjacent tracks (that is, the several tracks with consecutive physical positions). Here, it is assumed that the locality of the accesses from the host 20, the accesses concentrate, for example, on the adjacent tracks 1 and 2, resulting in 500 writes to each of tracks 1 and 2. Here, it should be noted that tracks 1 and 2 belong to the different groups 0 and 1.

In contrast, according to the conventional technique, a set of a plurality of tracks on the disk 100 including tracks 0, 1, ..., 15, 16, 17, ..., 31 is partitioned into groups each with a given number of tracks consecutive in the radial direction on the disk 110. If the set of tracks on the disk 110 is partitioned into groups each with 16 tracks, tracks 1 and 2 belong to the same group unlike in the case of the first embodiment.

Here, it is assumed that when the number of writes (hereinafter referred to as the write count) to a group exceeds a threshold Rth for the per group write count, a refresh process intended for the group is carried out. The threshold Rth is preset to a value at which even if data writes concentrate on one track in the group, provided that the write count does not exceed the threshold Rth, degradation of the magnetic data in the adjacent track can be sufficiently restored by refreshing.

Here, the threshold Rth is assumed to be 999. In this case, according to the conventional technique, even if the number of writes to each of tracks 1 and 2 is 500 as described above, the write count for the group to which tracks 1 and 2 belong exceeds the threshold RTh. Thus, according to the conventional technique, all the tracks in the group to which tracks 1 and 2 belong are refreshed. That is, even the tracks adjacent to, for example, a track subjected to no write and belonging to the group to which tracks 1 and 2 belong are refreshed.

Furthermore, the write count (500) for each of tracks 1 and 2 is sufficiently smaller than the threshold Rth (999). Thus, the magnetic data in the tracks adjacent to tracks 1 and 2 is not degraded to the degree that the magnetic data needs to be refreshed. Nevertheless, the adjacent tracks are refreshed.

In contrast, in the first embodiment, tracks 1 and 2 belong to the different groups 0 and 1. Thus, even when local accesses to tracks 1 and 2 occur repeatedly, the accesses are counted as write counts for the different groups 0 and 1, Thus, if the write counts for the other tracks in groups 0 and 1 are 0, each of the write counts for groups 0 and 1 is 500, which is smaller than the threshold Rth. Thus, not all the tracks in groups 0 and 1 are refreshed yet. Naturally, the tracks adjacent to tracks 1 and 2 are neither refreshed. That is, the first embodiment can prevent unwanted refreshing of tracks with magnetic data not degraded to the degree that the magnetic data needs to be refreshed.

Furthermore, in the first embodiment, the CPU 280 functions as a grouping module to associate each group x (x=0, 1, ... ) with a 16-bit bitmap BMx indicating whether or not any write has been executed on the 16 tracks belonging to each group x (x=0, 1, ... ) as described below in detail. Each bit bj (j=0, 1, ..., 15) in the bitmap BMx is used as a write execution bit indicating whether or not any write has been executed on a track in the group to which the bit bj is assigned. Here, the bit bj with a value of "1" indicates that at least one write has been executed on the corresponding track. The bit bj with a value of "0" indicates that no write has been executed on the track. The initial value of the bit bj is "0".

In the first embodiment, if the write count WCx for the group x exceeds the threshold Rth, a refresh process intended for the group x is carried out. However, unlike in the case of the conventional technique, not all the tracks in the group x are refreshed. That is, in the refresh process applied in the first embodiment, the CPU 280 functions as a refresh controller to refer to the bitmap BMx corresponding to the group x. The CPU 280 refreshes only the tracks adjacent to a track corresponding to the bit bj (=1) indicating that a write has been executed on the track. That is, the CPU 280 excludes the tracks adjacent to a track corresponding to the bit bj (=0) indicating that no write has been executed on the track.

No write has been executed on the track corresponding to the bit bj indicative of the non-execution of a write. Thus, it should be noted that the tracks adjacent to this track need not be refreshed. The first embodiment can prevent tracks not requiring refreshing as described above from being unnecessarily refreshed, using the refresh process based on the bitmap BMx.

FIG. 5 shows an example of the refresh management table 261 applied in the first embodiment. The refresh management table 261 includes entries the number of which is the same as that of the groups. Each of the entries in the refresh management table 261 comprises a group number field 262, a write count field 263, and a bitmap field 264.

The group number field 262 is used to store the group number x of the group associated with the entry including this field 262. In the first embodiment, the group number x is expressed by 2 bytes.

The write count field 263 is used to store the number WCx of data writes to the group x associated with the entry including this field 263, that is, the write count WCx for the group x. In the first embodiment, the write count WCx x is expressed by 2 bytes. If the write count WCx exceeds the threshold RTh, a refresh process intended for the group x is carried out.

The bitmap field 264 is used to store the bitmap BMx indicating whether or not any write has been executed on each of the 16 tracks belonging to the group x. In the first embodiment, in which one group comprises 16 tracks, the bitmap BMx is managed as binary data comprising 16 bits. That is, bit numbers (bit position numbers) are assigned to the 16 bits included in the bitmap BMx. The bit bj with a bit number j (j=0, 1, . . . , 15), that is, the j-th bit bj, in the bitmap BMx indicating whether or not data has been written to the track in the group x to which the bit bj is assigned. The relationship between the bit bj and the track to which the bit bj is assigned will be described below.

Now, operations performed during a data write according to the first embodiment will be described with reference to a flowchart in FIG. 6. First, it is assumed that the host 20 issues, to the HDD 10, a request for a data write to the track T with a track number T. Then, the CPU 280 functions as a write control module to carry out a write process for writing data to the target track T on the disk 110 (block 601).

Then, based on the track number T, the CPU 280 obtains the group number x of the group x to which the track T belongs (block 602). Furthermore, based on the track number T, the CPU 280 obtains (determines) the bit number (position) j of the bit bj contained in the bitmap BMx corresponding to the group x and assigned to the track T (block 603). Here, position data P described below is obtained based on the track number T. The bit number j of the bit bj indicated by the position data is obtained. In the description below, the "bitmap BMx corresponding to the group x" is expressed simply as the "bitmap BMx" in order to avoid complication. A mechanism for acquiring the group number x and the bit number j of the bit bj in the bitmap BMx based on the track number T will be described.

Then, the CPU 280 functions as a write management module to refer to an entry in the refresh management table 261 which is associated with the group x with the group number x (block 604). The CPU 280 then increments the value in the write count field 263 of the referred-to entry, that is, the write count WCx (block 605). The CPU 280 also sets the bit bj in the bitmap BMx stored in the bitmap field 264 of the referred-to entry, to "1" (block 606).

Here, the refresh management table 261 is loaded from the flash memory 260 into the buffer RAM 250 when the HDD 10 is powered on, in order to allow an increase in the speed of accesses to the refresh management table 261. The refresh management table 261 loaded into the buffer RAM 250 is used in blocks 604 to 606. The refresh management table 261 may be loaded into the RAM 290.

Then, the CPU 280 functions as a refresh controller to determine whether or not the incremented write count WCx exceeds the threshold Rth (block 607). If the write count WCx exceeds the threshold Rth (Yes in block 607), the CPU 280 proceeds to a refresh process intended for the group x (block 608). A procedure for this refresh process will be described below. In contrast, if the write count WCx does not exceed the threshold Rth (No in block 607), the CPU 280 skips the refresh process (block 608).

Now, the mechanism for acquiring the group number x and the bit number j of the bit bj in the bitmap BMx based on the track number T will be described with reference to FIG. 7. As shown in FIG. 7, the track number T is expressed by 23 bits. The lower 19 bits of the 23-bit track number T indicates the group number x of the group x to which the track T with the track number T belongs as a result of grouping. The integral value j of the upper 4 bits of the track number T indicates the bit number of the bit bj in the bitmap which is assigned to the track T. Thus, the upper 4 bits of the track number T are used as the position data P indicative of the bit number of the bit bj in the bitmap BMx which is assigned to the track T. Apparently, the group x is a set of tracks with 16 ($2^4$) track numbers with a difference of $2^{19}$ (N=$2^{19}$) between two adjacent track numbers. That is, the group x is a set of 16 tracks with nonconsecutive physical positions. In contrast, the group applied in the conventional technique is a set of tracks with consecutive physical positions.

Thus, extracting the lower 19 bits from the track number allows acquisition of the group number x of the group x to which the track T with the track number T belongs. Furthermore, when the upper 4 bits are extracted from the track number T as the position data P on the track T, the bit number j of the bit bj in the bitmap BMx which is assigned to the track T can be obtained. Furthermore, as is also apparent from FIG. 7, tracks with track numbers close to one another belong to different groups.

Figure 8:
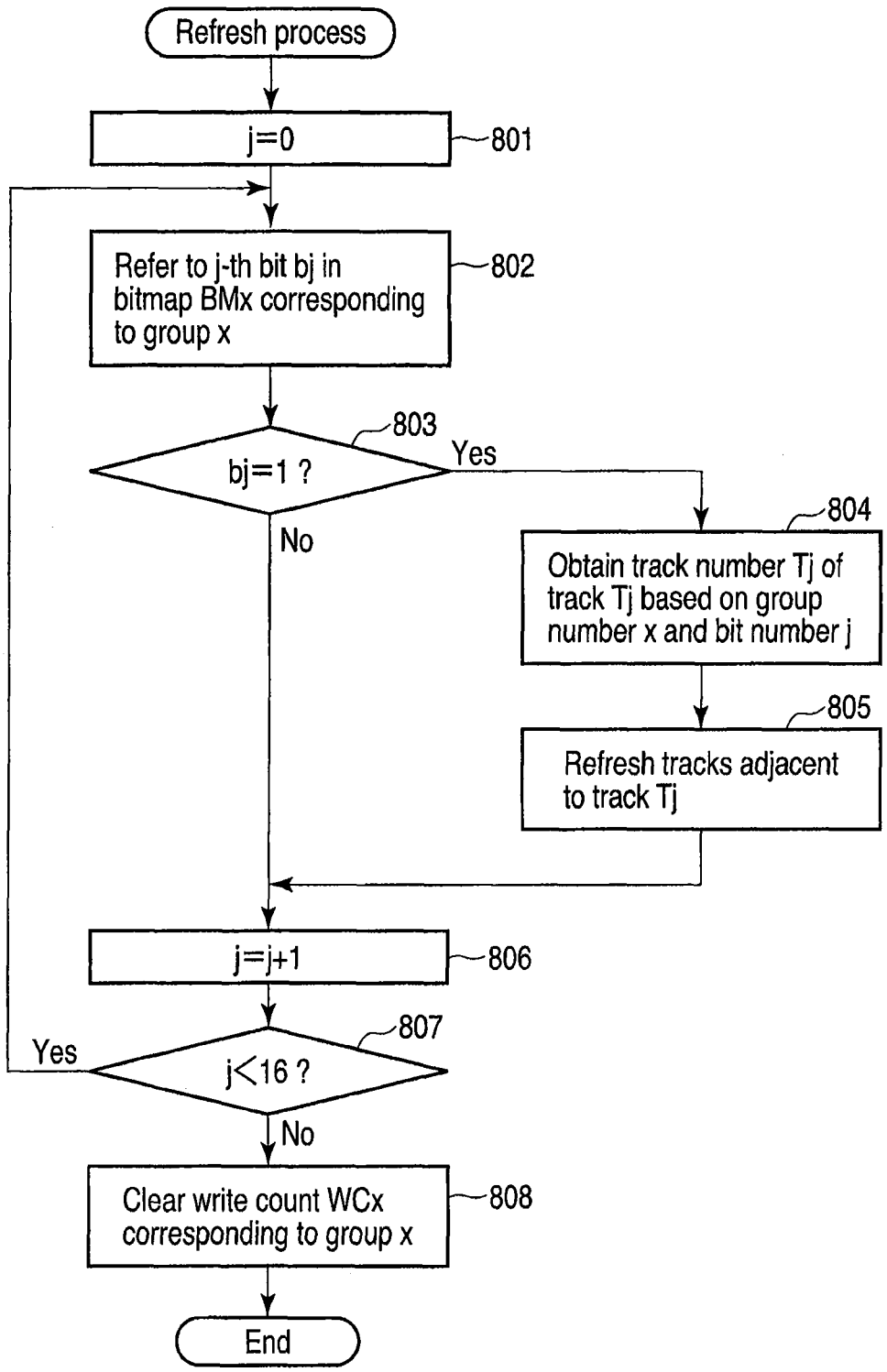
FIG. 8 is a flowchart showing an exemplary procedure for a refresh process intended for a group, the procedure being applied in the first embodiment.

Now, a refresh process (block 608) intended for the group x with the group number x will be described with reference to a flowchart in FIG. 8. First, the CPU 280 sets the variable j specifying the bit number of the bit bj in the bitmap BMx, to an initial value of 0 (block 801). The bitmap BMx is stored in the bitmap field 264 of the entry in the refresh management table 261 which is associated with the group x.

Then, the CPU 280 refers to the j-th bit bj in the bitmap BMx (block 802) to determine whether or not the bit bj is "1" (block 803). If the bit bj in the bitmap BMx is "1" (Yes in block 803), the CPU 280 determines that data has been written to the track Tj to which the bit bj is assigned (the track Tj corresponding to the bit bj) and that the tracks adjacent to the track Tj need to be refreshed. In this case, the CPU 280 proceeds to block 804 in order to refresh the tracks adjacent to the track Tj corresponding to the bit bj.

In block 804, the CPU 280 obtains the track number Tj of the track Tj corresponding to the bit bj with the bit number bj in the bitmap BMx based on the group number x and the variable (bit number) j. Here, as is apparent from FIG. 7, the track number Tj of the track Tj is obtained by concatenating 4-bit binary data indicative of the bit number j (that is, the bit number j of the bit bj indicated by the variable) with the upper bits of the group number x (19 bits). Then, the CPU 280 refreshes the tracks adjacent to the track Tj specified by the obtained track number Tj (block 805). Upon carrying out block 805, the CPU 280 proceeds to block 806.

On the other hand, if the bit bj in the bitmap BMx is not "1" (No in block 803), the CPU 280 determines that no data has been written to the track Tj corresponding to the bit bj and that the track Tj thus need not be refreshed. In this case, the CPU 280 skips blocks 804 and 805 to proceed to block 806.

In block 806, the CPU 280 increments the bit number j by one. The CPU 280 then determines whether or not the incremented bit number j is smaller than 16 (block 807). If the incremented bit number j is smaller than 16 (Yes in block 807), the CPU 280 returns to block 802 and refers to the j-th bit bj in the bitmap BMx which is indicated by the incremented bit number j.

In contrast, if the incremented bit number j is not smaller than 16 (No in block 807), the CPU 280 determines that the bitmap BMx has been processed up to the final bit (15th bit) b15. In this case, the CPU 280 clears the write count WCx set in the write count field 263 of the entry in the refresh management table 261 which is associated with the group x with the group number x (block 88). The CPU 280 then finishes the refresh process intended for the group x.

In the first embodiment, owing to the above-described grouping, the lower 19 bits of the 23-bit track number T are defined as the group number x of the group x to which the track T with the track number T belongs. Furthermore, the upper 4 bits of the track number T are defined as the position data P indicative of the bit position bj in the bitmap BMx. Thus, in the first embodiment, the group number x and the position data P can be easily obtained from the track number T.

As described above, the refresh management table 261 is loaded into the buffer RAM 250 for use. Hence, the CPU 280 saves the refresh management table 261 stored in the buffer RAM 250 to the flash memory 260 at least when the HDD 10 is powered off. Of course, the refresh management table 261 may be saved to the flash memory 260 every time the refresh management table 261 is updated. Alternatively, the refresh management table 261 may be saved to a particular storage area on the disk 110.

In the first embodiment, all the physical positions of the 16 tracks belonging to the group x are nonconsecutive. However, the physical positions of more than one of the 16 tracks may be nonconsecutive. Furthermore, in the first embodiment, if the bit bj of the bitmap BMx is "1", the tracks adjacent to the track Tj to which the bit bj is assigned are refreshed. However, if no write has been executed on each of the adjacent tracks, these adjacent tracks may be excluded from the refresh targets. Whether or not no write has been executed on the adjacent track can be determined depending on whether or not the bit bj corresponding to the adjacent track and contained in the bitmap BMx corresponding to the group to which the adjacent track belongs is "0". Furthermore, the track Tj may also be refreshed.

Second Embodiment

Now, a second embodiment will be described. The basic configuration of an electronic device comprising an HDD according to the second embodiment is similar to that according to the first embodiment. Thus, FIG. 1 is used for the description below. The second embodiment is characterized in that the CPU 280 uses a translation table in order to obtain the group number x and position data P from the track number T.

Figure 9:
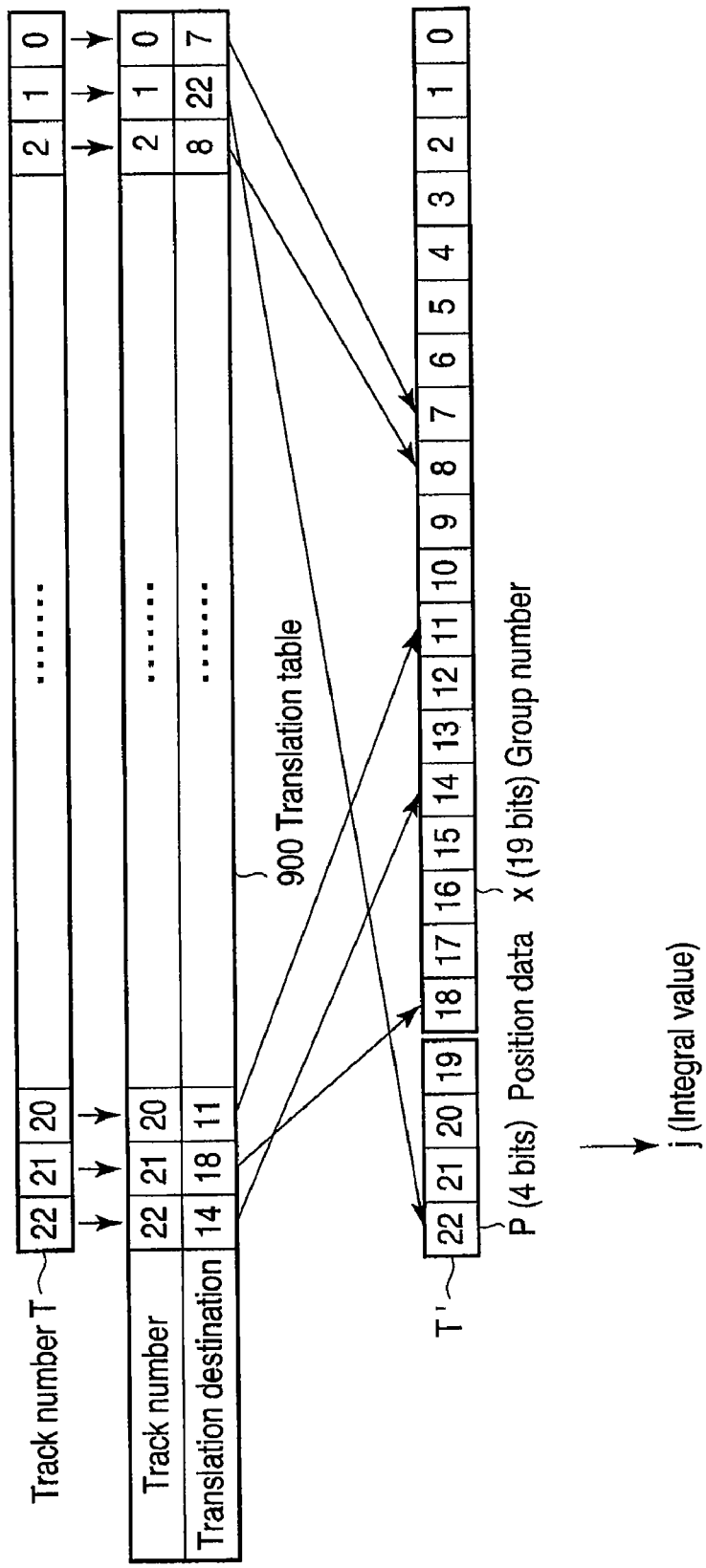
FIG. 9 is a diagram showing an example of a translation table applied in a second embodiment.

FIG. 9 shows an example of a translation table 900 applied in the second embodiment. The translation table is assumed to be stored in the flash memory 260 similarly to the refresh management table 261. Like the refresh management table 261, the translation table 900 is loaded into the buffer RAM 250 when HD 10 is powered on. The translation table 900 is used by the CPU 280 to translate the 23-bit track number T into the 19-bit group number x and the 4-bit position data P. Here, 4 bits including bit 1 of the track number T are translated into the position data P. The remaining 19 bits of the track number T, that is, the 19 bits including bits 0, 2, 20, 21, and 22, are translated into the group number x.

The translation table 900 shown in FIG. 9 can be considered to be a bit position change module configured to translate the 23-bit track number into another 23-bit track number T' by changing the bit positions of the track number T. In the example in FIG. 9, the upper 4 bits of the track number T' indicate the position data P. The lower 19 bits of the track number T' indicate the group number x. Furthermore, the track number Tj can be obtained from the position data P and the group number x by applying an inverse translation using the translation table 900, to the above-described block 804. The position data P can be obtained by translating the bit number j (variable j) of the bit bj into 4-bit binary data. The second embodiment allows the track number and the group number to be freely associated with each other by the application of the translation table 900. The translation table 900 may be prepared for each of the heads or for every plural areas (for example, inner circumferential areas and outer circumferential areas) into which the disk 110 is partitioned in the radial direction.

Third Embodiment

Now, a third embodiment will be described. The basic configuration of an electronic device comprising an HDD according to the third embodiment is similar to that according to the first embodiment. Thus, FIG. 1 is used for the description below. A first characteristic of the third embodiment is that the CPU 280 uses a translation table as in the first embodiment in order to obtain the group number and position data P from the track number T. A second characteristic of the third embodiment is that the CPU 280 functions as a grouping module to assign (associate) the bit bj in the bitmap BMx to (with) more than one track in the same group x. This enables a reduction in the storage areas in the flash memory 260 and buffer RAM 250, used to store the refresh management table 261. In the third embodiment, a set of more than one track assigned to the bit bj is called a subgroup. That is, the group x is partitioned into a plurality of subgroups.

Figure 10:
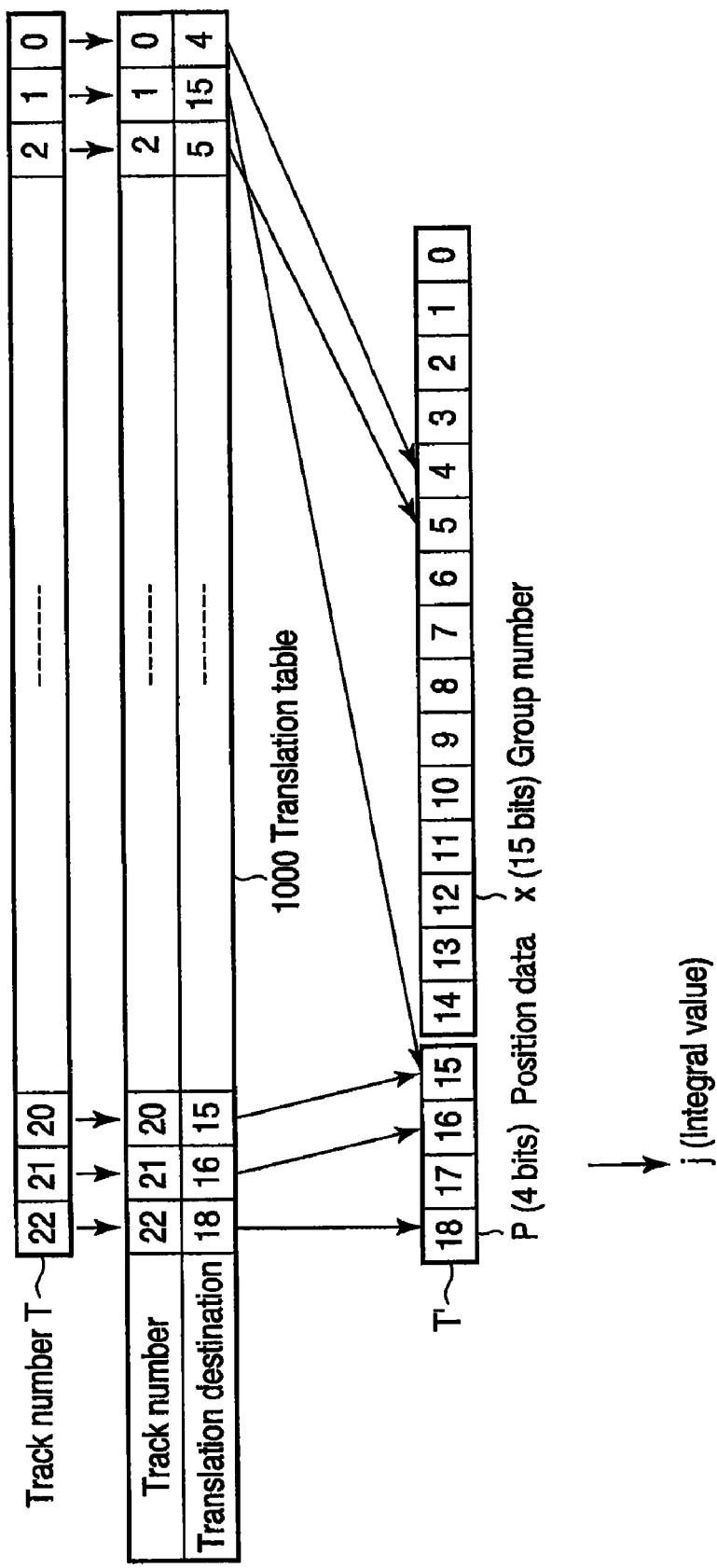
FIG. 10 is a diagram showing an example of a translation table applied in a third embodiment.

FIG. 10 shows an example of a translation table applied in the third embodiment. Like the refresh management table 261, the translation table 1000 is stored in the flash memory 260 and loaded into the buffer RAM 250 when HD 10 is powered on. The translation table 1000 is used by the CPU 280 to translate the 23-bit track number T into a 15-bit group number x and 4-bit position data P. Thus, in the third embodiment, the number of bits of the group number x is smaller than in the first and second embodiments by 4. That is, in the third embodiment, the number of groups in the third embodiment is $1/2^4 (=1/16)$ of that in the first and second embodiments. On the other hand, the number of tracks T belonging to each group x is equal to that in the first and second embodiments multiplied by $2^4 (=16)$, that is, 256.

In this case, to allow each of the bits bj in the bitmap BMx to be assigned to a corresponding one of the 256 tracks on a one-to-one basis, the number of bits in the bitmap BMx needs to be increased from 16 to 256. Thus, the third embodiment utilizes a configuration in which each of the bits bj is assigned to a subgroup with more than one track T (for example, 16 tracks) compared to the first and second embodiment, in which the number of bits in the bitmap BMx is 16.

In accordance with the translation table 1000 shown in FIG. 10, the CPU 280 translates the 8 bits of the track number T including bits 1, 20, 21, and 22 into the 4-bit position data P. Thus, for example, bits 1 and 20 of the track number T are translated into the least significant bit (bit 15 of the track number T' described below) of the position data P. In this case, "0" or "1" determined by a combination of bits 1 and 20 of the track number T is set for bit 15. More specifically, four combinations of bits 1 and 20 are available, "00", "01", "10", and "11". Thus, the first one of the four combinations is translated into "0" for bit 15. Each of the remaining second combinations is translated into "1" for bit 15. This also applies to the remaining 3 bits (bits 16 to 18) of the position data P. Such a translation allows each of the bits bj in the bitmap BMx to be assigned to a corresponding one of more than one track, for example, 16 tracks (more specifically, a subgroup with 16 tracks).

The remaining 15 bits of the track number T, that is, the 15 bits including bits 0 and 2, are translated into the 15-bit group number x. The position data P and the group number x can be considered to be the upper 4 bits and lower 15 bits, respectively, of the 19-bit track number T' into which the 23-bit track number T is translated by the translation table 1000.

In the third embodiment, if a write is executed on the track T, the CPU 280 translates the track number T of the track T into the position data P and the group number x in accordance with the translation table 1000 (this operation corresponds to blocks 602 and 603 in FIG. 6). The integral value j of the position data P indicates the bit number of the bit bj in the bitmap BMx which is assigned to a subgroup in the group x to which the track T belongs. Thus, the CPU 280 sets "1" for the bit bj as is the case with the first embodiment.

The operation in which the CPU 280 translates the track number T into the position data P and the group number x based on the translation table 1000 is equivalent to partitioning of the group x into 16 subgroups each with more than one track and the subsequent assignment of each of the bits bj in the bitmap BMx to a corresponding one of the 16 subgroups. The third embodiment assumes that each subgroup comprises more than one track. However, each subgroup may comprise at least one track. Apparently, the first and second embodiments correspond to the case in which each of the 16 subgroups comprises one track.

The third embodiment allows the number of entries in the refresh management table 261 to be reduced to $1/256$ of the number of entries in the second embodiment. This enables a reduction in the storage area required to store the refresh management table 261. However, in the third embodiment, when bits bj in the 16-bit bitmap BMx are assigned to a plurality of tracks, even if no write has been executed on any of the plurality of tracks, this track is also to be refreshed.

Fourth Embodiment

Now, a fourth embodiment will be described. The basic configuration of an electronic device comprising an HDD according to the fourth embodiment is similar to that according to the first embodiment. Thus, FIG. 1 is used for the description below. The fourth embodiment is characterized in that the number of tracks in a subgroup assigned to each of the bits bj in the bitmap BMx (this number of tracks corresponds to a subgrouping density) is set in accordance with the track area associated with the subgroup.

The following is generally known: if the recording surface on the disk 110 is partitioned into a plurality of areas (hereinafter referred to as track areas), outer circumference-side track areas are more frequently used, whereas inner circumference-side track areas are more infrequently used. Thus, in the fourth embodiment, the subgrouping density used to partition the group x into a plurality of subgroups is set to be lower for the subgroups corresponding to the outer circumference-side track areas and to be higher for the subgroups corresponding to the inner circumference-side track areas. Thus, the number of tracks in the track area is also set so as to be smaller for the outer circumference-side track areas and to be larger for the inner circumference-side track areas. The subgrouping density is hereinafter referred to as the subgrouping coefficient J. The subgrouping coefficient J indicates the number of tracks belonging to the corresponding subgroup, that is, the number of tracks to which the bits bj in the bitmap BMx are assigned.

FIG. 11 shows an example of a subgrouping coefficient table 1100 applied when the CPU 280 functions as a subgrouping module to subgroup the group x in the fourth embodiment. The subgrouping coefficient table 1100 is assumed to be stored in the flash memory 260 similarly to the refresh management table 261. Like the refresh management table 261, the subgrouping coefficient table 1100 is loaded into the buffer RAM 250 when the HDD 10 is powered on.

The subgroup coefficient table 1100 contains entries the number of which is the same as that of the track areas. Each of the entries in the subgroup coefficient table 1100 comprises a track area start number field 1101, a track area end number field 1102, a subgrouping coefficient field 1103, and a bit number field 1104. The start track number (track area start number) Ts of the corresponding track area is pre-stored into the track area start number field 1101. The end track number (track area end number) Te of the corresponding track area is pre-stored into the track area end number field 1102.

The number J of tracks belonging to a subgroup associated with the corresponding track area when the group x is partitioned into subgroups is pre-stored into the subgrouping coefficient field 1103 as the subgrouping coefficient J. The bit number field 1104 indicates the bit number j of the bit bj assigned to the corresponding subgroup in the bitmap BMx.

In an example of the subgrouping coefficient table 1100 shown in FIG. 11, the range of the group number x is assumed to be between "0000h" and "FFFFh". In this case, the CPU 280 can calculate the group number x based on the grouping coefficient J and the track number T in accordance with:

$$x = (T/J) \bmod 10000h$$

where "mod" denotes the remainder of an integer division.

For example, if the track number T is "758E3h", the CPU 280 recognizes that the track number T belongs to the track area indicated by the track start number 70000h and the track end number 8FFFFh, based on the fifth entry in the subgrouping coefficient table 1100. At this time, the CPU 280 also recognizes that the grouping coefficient J corresponding to the track area is 2. In this case, the CPU 280 obtains the group number x expressed by:

$$x = (758E3h/2) \bmod 10000 = AC71h$$

Furthermore, based on the fifth entry in the subgrouping coefficient table 1100, the CPU 280 determines 4 to be the bit number j of the bit bj in the bitmap BMx which is assigned to the subgroup including the track T with the track number T "758E3h".

In the fourth embodiment, the CPU 280 is assumed to carry out a refresh process intended for the group x with the group number "x". In this case, the CPU 280 calculates the track number of at least one refresh target track based on the group number x and the bit number j (that is, the variable j according to the first embodiment) of the bit bj (=1) in the bitmap BMx, as described below. The refresh target tracks are the tracks adjacent to the tracks belonging to the group x with the group number x and further belonging to the subgroup to which the bit number j is assigned.

First, the CPU 280 refers to the subgrouping coefficient table 1100 to obtain the track area start number Ts and subgrouping coefficient J corresponding to the bit number j. Then, the CPU 280 calculates the track number (refresh start track number) RSTN of the start track (refresh start track) of the at least one refresh target track and the track number (refresh end track number) RETN of the end track (refresh end track) of the at least one refresh target track in accordance with:

$$RSTN = Ts + x * J$$

$$RETN = Ts + x * J + J - 1$$

$$= RSTN + J - 1$$

If the grouping coefficient J is 1, the refresh start track number RSTN is equal to the refresh end track number RETN. In this case, only one track indicated by "Ts (track area start number)+x (group number)" is the refresh target track. For example, if the group number x is "AC71h" and the bit number j is 4, the CPU 280 determines the track area start number Ts to be "70000h" and determines the subgrouping coefficient J to be 2, based on the subgrouping coefficient table 1100. In this case, the refresh start track number RSTN and the refresh end track number RETN are expressed by:

$$RSTN = Ts + x * J$$
$$RETN = Ts + x * J + J - 1$$
$$= RSTN + J - 1$$

According to the fourth embodiment, the subgrouping density used to partition the group x into a plurality of subgroups is set to be lower for the subgroups corresponding to the outer circumference-side track areas and to be higher for the subgroups corresponding to the inner circumference-side track areas. Thus, even when relatively many tracks belonging to a subgroup with a higher subgrouping density is assigned to a bit bj in the bitmap BMx, the performance of a refresh process intended for a group including such subgroups can be prevented from being affected. Furthermore, the storage area required to store the refresh management table 261 can be reduced.

In the third and fourth embodiments, if a bit bj in the bitmap BMx is "1", the tracks adjacent to at least one track belonging to the subgroup to which the bit bj is assigned are refreshed. However, those of the tracks adjacent to at least one track on which no write has been executed may be excluded from the refresh targets. Whether or not no write has been executed on a subgroup can be determined depending on whether or not the bit bj in the bitmap BMx which corresponds to the group to which the subgroup belongs is "0". Furthermore, if the bit bj in the bitmap BMx is "1", at least one track belonging to the subgroup to which the bit bj is assigned may be refreshed.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
    a grouping module configured to partition a set of tracks on a disk into a plurality of groups and configured to partition each of the plurality of groups into a plurality of subgroups, each of the plurality of groups comprising a plurality of tracks including at least two tracks with nonconsecutive physical positions and each of the plurality of subgroups comprising at least one track;
    a bitmap comprising, for each of the plurality of groups, a set of bits indicating whether or not any write has been executed on each of the plurality of subgroups;
    a write management module configured to count a write count for each of the plurality of groups and configured to manage, using the bitmap for each of the plurality of groups, whether or not any write has been executed on each of the plurality of subgroups in the group; and
    a refresh controller configured to exclude from the refresh targets, based on the bitmap corresponding to a group to be refreshed, a subgroup of the plurality of subgroups in the group to be refreshed on which no write has been executed when the refresh controller executes refresh process for the group to be refreshed, the group to be refreshed being a group of the plurality of groups for which the write count exceeds a threshold.

2. The magnetic disk drive of claim 1, wherein the write management module is configured to set a first bit in the bitmap to indicate that a write has been executed, in response to a write to a target track requested by a host, the bitmap with the first bit corresponding to the group to which the target track belongs, and the first bit corresponding to a subgroup to which the target track belongs.

3. The magnetic disk drive of claim 2, wherein the grouping module is configured to associate each of the tracks included in the set of tracks with a position of a bit in the bitmap corresponding to the group to which the track belongs and the subgroup to which the track belongs based on the track number of the track.

4. The magnetic disk drive of claim 3, wherein the grouping module is configured to define a group number for the group to which the track with the track number belongs based on a lower field in binary data indicative of the track number and to define position information indicative of the position of the bit based on an upper field in the binary data.

5. The magnetic disk drive of claim 3, further comprising a translation table for the association.

6. The magnetic disk drive of claim 1, wherein the refresh controller is configured to control refresh process for a track adjacent to the at least one track belonging to a subgroup included in the plurality of subgroups included in the group to be refreshed on which subgroup a write has been executed.

7. The magnetic disk drive of claim 1, wherein:
    each of the plurality of subgroups in the plurality of groups is associated with a predetermined track area on the disk; and
    the grouping module is configured to set the number of the at least one track included in each of the plurality of subgroups, in accordance with the corresponding track area.

8. The magnetic disk drive of claim 7, wherein the grouping module is configured to set the number of the at least one track to be smaller for a higher frequency with which the corresponding track area is used.

9. A refresh method for a magnetic disk drive, comprising:
    partitioning a set of tracks on a disk into a plurality of groups, each of the plurality of groups comprising a plurality of tracks including at least two tracks with nonconsecutive physical positions;
    partitioning each of the plurality of groups into a plurality of subgroups, each of the plurality of subgroups comprising at least one track;
    counting a write count for each of the plurality of groups;
    managing, using a bitmap for each of the plurality of groups, whether or not any write has been executed on each of the plurality of subgroups in the group, the bitmap comprising, for each of the plurality of groups, a set of bits indicating whether or not any write has been executed on each of the plurality of subgroups; and excluding from the refresh targets, based on the bitmap corresponding to a group to be refreshed, a subgroup of the plurality of subgroups in the group to be refreshed on which no write has been executed when refresh process for the group to be refreshed is executed, the group to be refreshed being a group of the plurality of groups for which the write count exceeds a threshold.

10. The refresh method of claim 9, further comprising setting a first bit in the bitmap to indicate that a write has been executed, in response to a write to a target track requested by a host, the bitmap with the first bit corresponding to the group to which the target track belongs, and the first bit corresponding to a subgroup to which the target track belongs.

11. The refresh method of claim 10, further comprising associating each of the tracks included in the set of tracks with a position of a bit in the bitmap corresponding to the group to which the track belongs and the subgroup to which the track belongs based on the track number of the track.

12. The refresh method of claim 11, further comprising defining a group number for the group to which the track with the track number belongs based on a lower field in binary data indicative of the track number and to define position information indicative of the position of the bit based on an upper field in the binary data.

13. The refresh method of claim 11, wherein the magnetic disk drive comprises a translation table for the association.

14. The refresh method of claim 9, further comprising controlling refresh process for a track adjacent to the at least one track belonging to a subgroup included in the plurality of subgroups included in the group to be refreshed on which subgroup a write has been executed.

15. The refresh method of claim 9, wherein:
each of the plurality of subgroups in the plurality of groups is associated with a predetermined track area on the disk; and
the refresh method further comprises setting the number of the at least one track included in each of the plurality of subgroups, in accordance with the corresponding track area.

16. The refresh method of claim 15, further comprising setting the number of the at least one track to be smaller for a higher frequency with which the corresponding track area is used.

\* \* \* \* \*